(12) United States Patent
Maroney (10) Patent No.: US 8,417,979 B2
(45) Date of Patent: Apr. 9, 2013

(54) METHOD AND SYSTEM FOR PROGRESSIVE POWER REDUCTION OF INACTIVE DEVICE WHILE MAINTAINING READY STATUS WITH HOST

(75) Inventor: John E. Maroney, Irvine, CA (US)

(73) Assignee: Western Digital Technologies, Inc., Irvine, CA (US)

( * ) Notice: Subject to any disclaimer, the term of this patent is extended or adjusted under 35 U.S.C. 154(b) by 288 days.

(21) Appl. No.: 12/978,376

(22) Filed: Dec. 23, 2010

(65) Prior Publication Data

US 2012/0166828 A1 Jun. 28, 2012

(51) Int. Cl.
*G06F 1/32* (2006.01)

(52) U.S. Cl. .............. 713/323; 710/18; 710/19; 713/324

(58) Field of Classification Search ................ 710/18.19; 713/320, 323, 324
See application file for complete search history.

(56) References Cited

U.S. PATENT DOCUMENTS

| | | |
|---|---|---|
| 5,493,670 A | 2/1996 | Douglis et al. |
| 5,682,273 A | 10/1997 | Hetzler |
| 6,608,729 B1 | 8/2003 | Willems et al. |
| 6,725,385 B1 | 4/2004 | Chu et al. |
| 7,752,471 B1 | 7/2010 | Kolokowsky |
| 7,882,378 B2 * | 2/2011 | Igari ............................. 713/320 |
| 2006/0005052 A1* | 1/2006 | Roe et al. ...................... 713/300 |
| 2009/0024860 A1 | 1/2009 | Krishnamoorthy et al. |
| 2009/0132838 A1 | 5/2009 | Cherian et al. |
| 2009/0204835 A1 | 8/2009 | Smith et al. |

FOREIGN PATENT DOCUMENTS

WO 2008/010795 A1 1/2008

* cited by examiner

*Primary Examiner* — Albert Wang (57) ABSTRACT

The embodiments provide a system and method for device power control. In particular, the embodiments enable a device, such as a direct attached storage device coupled to a host, to enter into a mode that consumes less power. In one embodiment, the mode is self-initiated and triggered based on a preset timeout of non-use or other condition. Alternatively, this reduced power mode may be initiated based on a request by the host. During the reduced power mode of operation, the device may continue to appear active or on-line to its host. However, if its non-use persists, the device may employ a progression of power saving actions. If needed by the host, the direct attached storage device is configured to respond as if it were on-line and reverse one or more of the progression of power saving actions.

21 Claims, 6 Drawing Sheets

METHOD AND SYSTEM FOR PROGRESSIVE POWER REDUCTION OF INACTIVE DEVICE WHILE MAINTAINING READY STATUS WITH HOST

DESCRIPTION OF THE EMBODIMENTS

Background

Due to the rising costs of powering and cooling computer systems and storage, power consumption has become an increasingly important concern in all computing markets. It is now a de facto requirement that system components, such as peripherals and host controllers, support some form of power management.

Power management typically includes removing or reducing power to circuitry or electromechanical elements during times when they are not being used, thereby reducing the overall power consumption of the system. Power management protocols have been included in many interface standards, including Serial Attached SCSI and Serial ATA. The Serial ATA (SATA) interface is pervasive in the PC market and has a significant presence in server and enterprise computing environments. SATA is also ubiquitous in the battery-operated notebook computer market, in part due to its aggressive approach to power minimization.

Unfortunately, however, the known power management schemes are controlled by the host and tend to be inefficient. Moreover, even the known power management schemes are unable to meet the desired power consumption goals of new conservation programs, such as Energy STAR and EuP. Accordingly, the embodiments provide a progression of power saving actions by the device, without requiring host involvement or even changing the appearance of the device to the host.

BRIEF DESCRIPTION OF THE DRAWINGS

The accompanying drawings, which are incorporated in and constitute a part of this specification, illustrate embodiments of the invention and together with the description, serve to explain the principles of the embodiments. In the Figures.

DESCRIPTION OF THE EMBODIMENTS

The embodiments provide a system and method for device power control. In particular, the embodiments relate to a device, such as a direct attached storage device coupled to a host, to enter into a mode that consumes less power. The mode is self-initiated and triggered based on a preset timeout of non-use or other condition. During this mode of operation, the device may continue to appear active or on-line to its host. However, the device may employ a progression of power saving actions if its non-use persists. If needed by the host, the direct attached storage device is configured to respond as if it were on-line and restore necessary power to the device. For example, the device may restore itself by reversing the progression of the power saving actions in the same or different order.

In some embodiments, the direct attached storage device is configured to self-initiated power management to meet EuP Lot 6 power guidelines and standards with minimal cost. For example, in some embodiments, the power saving actions put the direct attached storage device into one or more deeper sleep modes with soft power button of 1.0 W, 0.5 W, or less.

The power management of the embodiments are configured to initiate reduced power consumption, but with automatic wakeup without having to involve host actions. For example, in some embodiments, during wakeup, the host is provided drive enumeration information or other information as if the storage device were online.

The embodiments can accommodate a variety of power saving policies. These policies can be adapted to a specific device, application, and history of use. For example, the direct attached storage device may comprise a self-initiated standby that is entered into after a preset timeout after non-use with the host. The power saving actions implemented may include, among other things, a bridge ASIC that spins down the drive and puts the drive into a standby state, controls power field-effect transistors (FETs) to turn off drive power, disables internal SATA PHY logic, and if possible, shuts down all other interfaces or busses other than a host interface. Thus, the embodiments allow for flexible power management.

If the host needs to access the direct attached storage device, the device is configured to enumerate itself with the host, such as responding with a drive ID and PIDs/VIDs immediately or within a required timeframe. In some embodiments, the device is configured to store this information in a cache or flash memory. In addition to supplying this information, the direct attached storage device may commence reversing its progression of power saving actions or otherwise repowering portions or the entire device.

Figure 1:
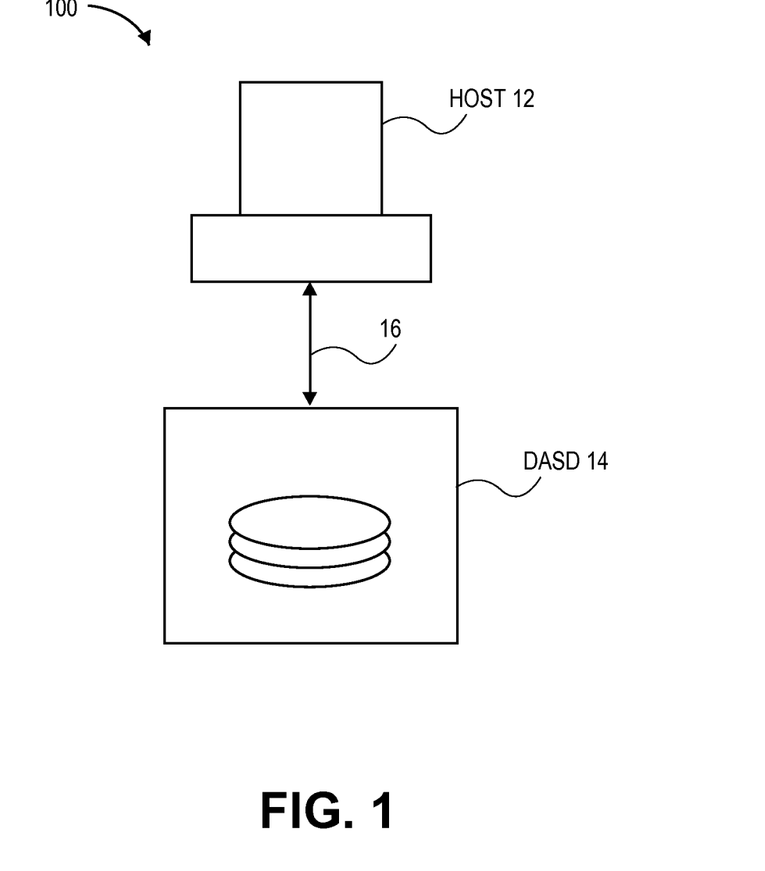
FIG. 1 shows an exemplary block diagram of a system consistent with the principles of the present invention.

Various embodiments of the present disclosure will now be described with reference to the accompanying figures, wherein like numerals may refer to like elements throughout. FIG. 1 shows an exemplary system consistent with the principles of the present invention. As shown, the system 100 may comprise a host device 12 and a direct attached storage device (DASD) 14. The host device 12 and DASD 14 may be coupled together via a communications link, such as a universal serial bus (USB) interface 16.

For purposes of illustration, the DASD 14 is shown as an externally attached device via the USB interface 16. In other embodiments, the storage device may be coupled internally within the host device. For example, the storage device may be an internal hard drive of a server that is coupled to the processor via a native USB bus.

In general, the host device 12 may refer to any computer, server, etc. that may request information stored on DASD 14. For example, the host device 12 may be a personal computer, laptop computer, server, etc. Although FIG. 1 shows a single host device, one skilled in the art will recognize the system 100 may comprise any number of host devices 12 alone or in combination with each other.

DASD 14 refers to a data storage device that may hold one or more hard disk drives or solid state drives. In other words, the embodiments may be applied to any data storage device in which reduction of standby power to a target power, such as 1 W or 0.5 W, is desired. For example, recent EuP guidelines and Energy Star ratings currently or potentially may specify certain power consumption goals for devices, such as DASD 14. In other embodiments, the DASD 14 may comprise one or more solid state drives. The order and nature of the power saving actions to reduce the standby power of the DASD 14 may be modified accordingly based on the nature of the solid-state drive components and their respective power consumption. For purposes of illustration, however, the examples described below relate to the DASD 14 comprising one or more hard disk drives, such as those manufactured by Western Digital Technologies.

As shown, DASD 14 is connected directly to the host device 12 via a communications link. In the embodiment shown, the DASD 14 is coupled to the host device via a USB 2.0 link 16. However, the communications link may be implemented as other types of links, such as USB 3.0, eSATA, SCSI, SAS, Firewire, and Fibre Channel. The DASD 104 may be shared among multiple interfaces and allow concurrent and direct access to its information. In addition, as noted above, the DASD 14 may be internal to the host device 12 and coupled via a communications bus, such as a native USB 3.0 bus.

Figure 2:
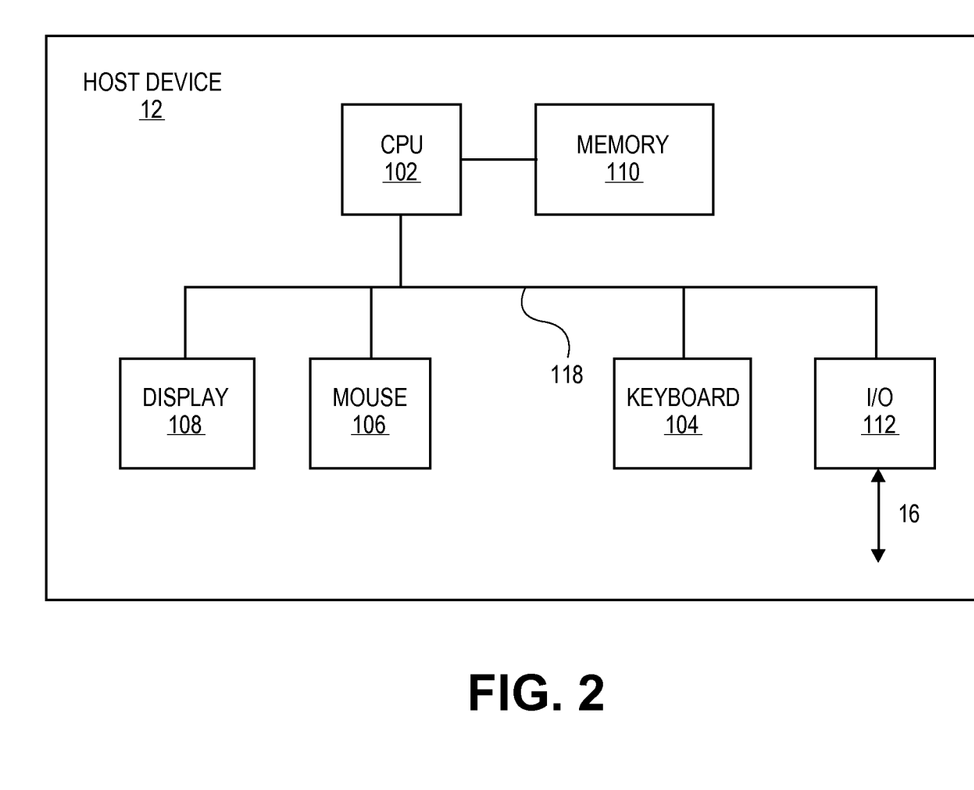
FIG. 2 shows an exemplary block diagram of an exemplary host.

FIG. 2 shows an exemplary block diagram of an exemplary host device 12. As shown, the host device 12 may be a general-purpose computer that is well known to those skilled in the art. For purposes of explanation, embodiments of the present invention will be explained with reference to a desktop computer. However, one skilled in the art will recognize that the embodiments of the present invention may be implemented on virtually any device, such as a laptop computer, personal digital assistant, smart phone, server computer, and the like, in which a user stores and accesses objects.

As shown, a host device 12 may include a central processor 102, a keyboard 104, a pointing device 106 (e.g., a mouse or the like), a display 108, a main memory 110, and input/output controller 112 that provides the USB interface 16 to DASD 14. Host device 12 may also be provided with additional input/output devices, such as a printer (not shown). The various components of the host device 12 communicate through a system bus 118 or similar architecture. As noted above, the host device 12 may be any form of computing device or system, such as a personal computer, a server, a laptop, etc.

Figure 3:
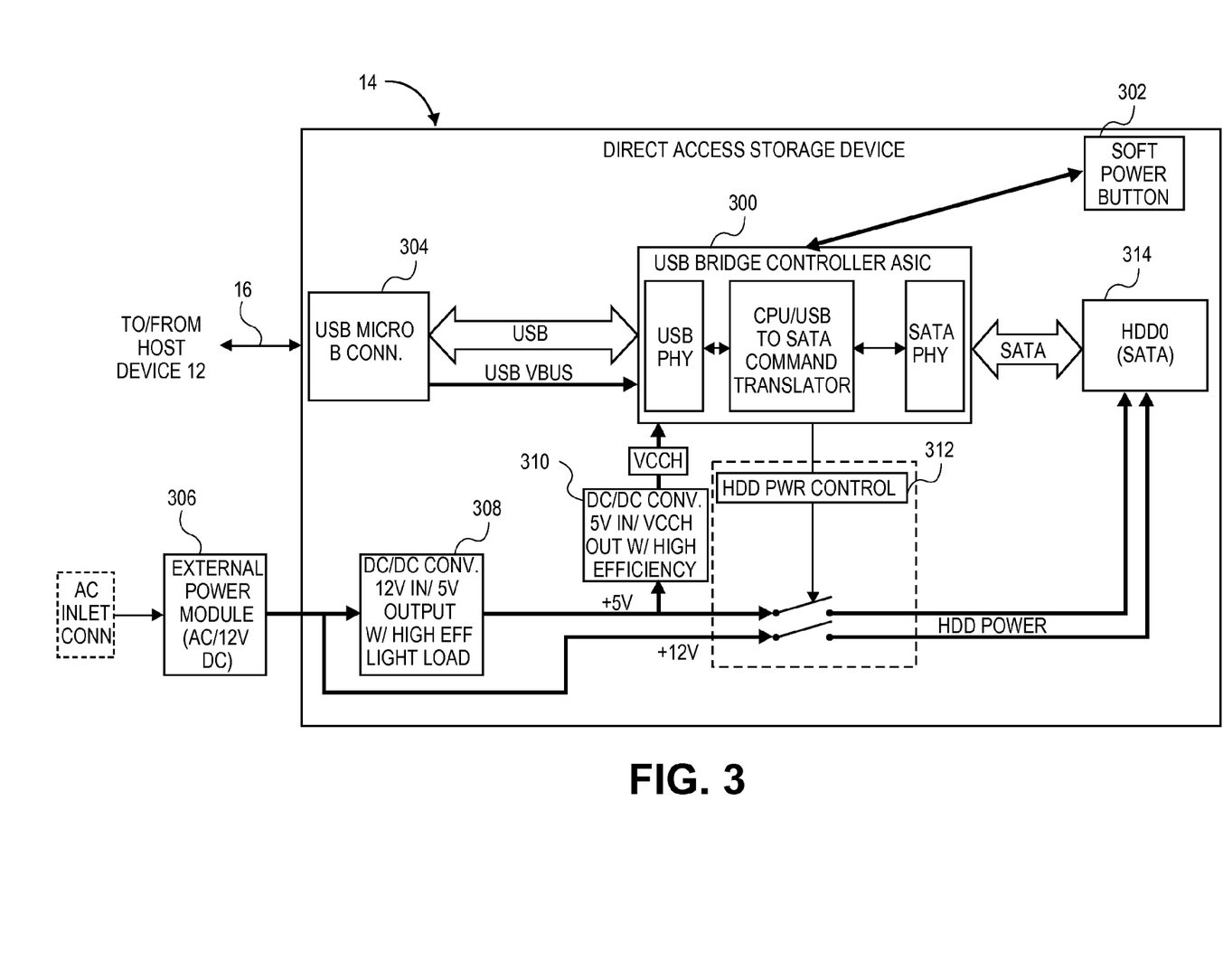
FIG. 3 shows an exemplary block diagram of a direct attached storage device in which the embodiments may be implemented.

FIG. 3 shows an exemplary direct attached storage device in which the embodiments may be implemented. As shown, the DASD 14 may comprise a bridge controller 300, a soft power control 302, a USB controller 304, an external power module 306, a first DC/DC converter 308, a second DC/DC converter 310, a drive power controller 312, and hard disk drive 314. These components will now be further described below.

Bridge controller 300 comprises the control logic and intelligence to control the operations of DASD 14 and provide the power consumption control of the embodiments. In particular, the bridge controller 300 translates communications between its USB interface to host device 12 and the SATA interface to the hard disk drive 314. Accordingly, as shown, the bridge controller 300 may comprise PHY logic circuitry 316 for USB and SATA PHY logic circuitry 318 as well as translation circuitry 320. In some embodiments, the bridge controller 300 is implemented as an ASIC. However, bridge controller 300 may be implemented using any form of circuitry hardware, firmware, etc. In general, the components of DASD 14 may be designed for low power consumption. For example, in anticipation of future EuP standards, the bridge controller 300 may consume about less than 0.45 W in one embodiment when its host interface enumerated SATA PHY logic circuitry 318 is disabled. In other embodiments, the bridge controller 300 may be configured to consume less then 0.25 W. Of course, the bridge controller 300 may be configured to meet any desired power consumption target in accordance with the embodiments.

Soft power control 302 provides an external control that allows the DASD to be powered down manually, for example, by a user. In addition, the soft power control 302 may also be coupled to host device 12 to allow the host device 12 to request standby power operations or a power shutdown on DASD 14. For example, in some embodiments, the host device 12 may utilize the SATA power management scheme to reduce the power consumption of the DASD 14 alone or in combination with the power saving functions of the embodiments.

The USB controller 304 serves as an interface that controls communications to/from DASD 14 over communications link 16. For example, the USB controller 304 may pass USB communications to the USB PHY logic 316 of the controller 300. As shown, the USB controller 304 is implemented as a USB microcontroller, which is well known to those skilled in the art.

The external power supply 306 couples the DASD 14 to an electrical source, such as an AC wall outlet or other AC power source. As shown, the external power supply 306 converts standard AC power into a 12 volt DC power signal into DASD 14. This 12-volt power output may provide the primary electrical power for the controller 300 as well as the hard disk drive 314. In some embodiments, the power supply 306 is configured to convert AC to DC at about 80% efficiency or more at medium to full loads. In other embodiments, the DASD 14 may be powered without the need of an external power supply 306. For example, the DASD 14 may be a USB-powered device, and thus, receive power from communications link 16.

In some embodiments, the power supply 306 may be an energy STAR level 5 compliant or EuP compliant supply that provides DC output power loads at less than 1 W. For example, assuming a target standby power consumption of less than 0.5 W or about 0.45 W, the power consumption by the power supply 306 should be at least 62%. This percentage is based upon the following calculation, where $$\text{AC in/DC output power Efficiency} \leq [0.0626 * \text{Ln}(\text{Pno})] + 0.622.$$

The calculation for the total load of the bridge controller 300 to achieve <1 W from AC main power supply 306 at 62% therefore can be derived as follows:

$$\text{Maximum idle Power bridge ASIC} = (\text{Power AC input}) \times (\text{Efficiency \% of AC adapter}) \times (\text{Efficiency of 5V DC/DC converter 308}) \times (\text{Efficiency \% VCCH DCDC converter 310})$$

$$= 1W * 62\% * 80\% * 90\%$$

$$= 0.45W$$

The first DC/DC converter 308 provides a DC/DC conversion from 12V to 5V to thus provide a 5 V DC output signal. In turn, the second DC/DC converter 310 steps down the 5 V signal into a VCCH voltage that drives the controller 300. Accordingly, as shown in the calculation above, the efficiency for the first DC/DC converter 308 and the second DC/DC converter 310 should be at least 80% and 90%, respectively.

The drive power controller 312 controls power delivery to the hard disk drive 314. For example, the drive power controller 312 may be a field-effect transistor (FET) switch. Of course, the drive power controller 312 may be implemented using other types of power controller components. In other embodiments, the drive power controller 312 is optional, and thus, the DASD 14 may lack this component. For example, the drive sleep power may be low enough or the efficiency of the other components, such as the DC/DC converter 308 and DC/DC converter 310, may be sufficient to render the drive power controller 312 unnecessary. Accordingly, in these embodiments, the nature and order of the power saving actions may be modified.

The hard disk drive 314 comprises the storage medium of the DASD 14 as well as the drive mechanism for spinning the storage medium. In some embodiments, such components are provided by Western Digital Technologies.

Figure 4:
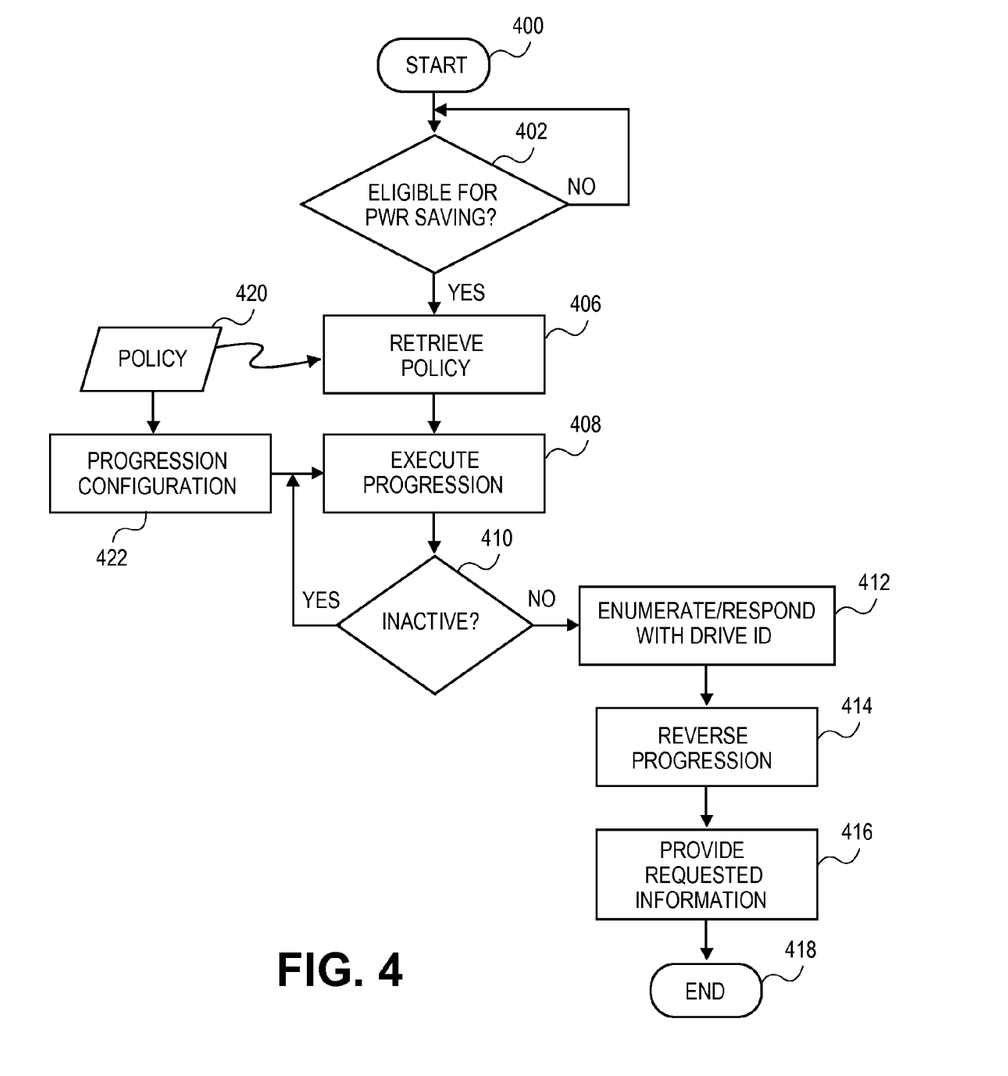
FIG. 4 shows an exemplary process flow diagram consistent with the principles of the present invention.

FIG. 4 shows an exemplary process flow consistent with the principles of the present invention. In stage 400, the DASD 14 may start its power saving process. This process may be initiated in several ways. For example, the controller 300 in DASD 14 may maintain an idle timer that monitors how long the DASD 14 has been inactive. Such a timer may be provided in translation circuitry 320. Alternatively, a user, for example, may request the power saving process via soft power control 302. As yet another alternative, the host device 12 may initiate the power saving actions by the DASD 14. Nonetheless, the embodiments provide a mechanism and process for the DASD 14 to preserve power consumption without the need for involvement by the host device 12.

In stage 402, the controller 300 determines whether the DASD 14 is eligible for power saving actions. For example, the controller 300 may determine that the DASD 14 has been inactive for a certain amount of time, such as via a standby timer. Alternatively, the controller 300 may determine eligibility based on a variety of factors, such as operating conditions of the host device 12, conditions of the power supply 306, etc. In stage 404, if the DASD 14 is not eligible for power saving, then processing repeats and the controller 300, for example, may wait for a period of time.

In stage 406, the controller 300 has determined that the DASD 14 is indeed eligible for power saving actions and retrieves a policy 420. The policy 420 comprises information that indicates how and when the DASD 14 reduces its power consumption. In some embodiments, the controller 300 may be configured with one or more policies 420. For example, one policy may specify a progression of actions that are executed based on a fixed interval of time.

Other policies, however, may specify that the progression of actions proceed based on variable interval. This interval may be based on the extent of the action to be taken as well as conditions facing the DASD 14. For example, the interval between spinning down the drive of hard disk drive 314 and powering down the power signal from power controller 312 may be relatively short. However, the interval between actions performed after these may be relatively longer. These intervals may be designed to balance power reductions goals versus information retrieval/storage of the DASD 14.

Furthermore, the policies 420 may be modified based on history of use by the DASD 14 and/or host device 12. For example, the host device 12 may provide a log of transactions that indicate a predictable pattern of usage or usage duty factor. DASD 14 may also record its own usage and calculate its own usage duty factor to determine how and when to execute its progression of power saving actions. Accordingly, the host device 12 may generate the policy 420 or DASD 14 based on this history of usage. The history may span virtually any amount of time, such as minutes, hours, days, weeks, etc.

The policy 420 may be stored in the hard disk drive 314, such as in a protected sector, and saved to a cache or memory in controller 300 (not shown). Moreover, the policy 420 may be downloaded to the DASD 14, for example, via host device 12 from an external authority, such as a manufacturer or system administrator.

Once retrieved, the controller 300 may select the progression of actions and create or follow a progression configuration 422. This progression configuration 422 specifies an order and timing of actions to be performed by the controller 300. For example, the progression configuration 422 may be implemented as a series of commands stored in a register of controller 300. Of course, the progression configuration 422 may be created and executed in a variety of ways in hardware, firmware, or with software executed by the controller 300.

Accordingly, in stage 408, the controller 300 executes its progression of power saving actions. As shown, in stage 410, the controller 300 monitors that the DASD 14 continues to remain inactive, and thus, the controller 300 continues to follow its progression of power saving actions. For example, the controller 300 may execute the following progression of power saving actions.

First, the bridge controller 300 may spin down drive 314 and put drive 314 into a standby state. For example, the controller 300 may send a SATA HIPM standby via the SATA PHY logic 318 to the drive 314.

Second, the bridge controller 300 may then command power controller 312 to turn off the 12 V and 5 V power signals from the converters 308 and 310. Third, the bridge controller 300 may disable and/or power off the SATA PHY logic 308. Fourth, the bridge controller 300 may itself go into an idle or standby state. Fifth, the bridge controller 300 may shut down other interfaces or busses other than the host connected USB interface via USB controller 304.

Of note, the bridge controller 300 maintains the interface with the host device 12 in order to ensure that the DASD 14 is responsive to a request from the host device. Accordingly, as shown in the figures, the bridge controller 300 maintains its USB link 16 with the host device 12 active to thus appear on-line or ready.

For example, in stage 412, the host device 12 may provide a read or write request to the DASD 14, which triggers the DASD 14 to come out of its inactive state. In some embodiments, in order to appear on-line to the host device 12, the controller 300 may provide sufficient information to enumerate the DASD 14 with the host device 12. For example, the DASD 14 may cache the drive identification, PID, VIDs, and other information of the DASD 14 to provide an immediate USB response to the host device 12 via the communications link 16. The controller 300 may cache this information from flash memory (not shown) and a protected area of the hard disk drive 314. Of note, in some embodiments, after the initial enumeration and response by the DASD 14, the controller 14 may confirm its response by checking the information provided from the flash memory matches the information stored in the protected area of the hard disk drive 314. If needed, the DASD 14 may provide new or modified information to ensure that it is correctly enumerated with the host device 12. By responding immediately with this information, the DASD 14 appears to be active to the host device 12, and in the interim in stage 414, reverses its progression of power saving actions needed to fully respond to the request. Of note, in some embodiments, the progression of actions is reversed in a reverse order that they were implemented. In other instances, the policy 420 may specify a different sequence of restoring the DASD 14 to full or partial power consumption state. Such sequences may depend on current operating conditions, desired performance, etc.

In stage 416, the DASD 14 has reversed its progression sufficiently to fully respond to the request from the host device 12. The process may thus end at stage 418 or repeat again at stage 400.

Figure 5:
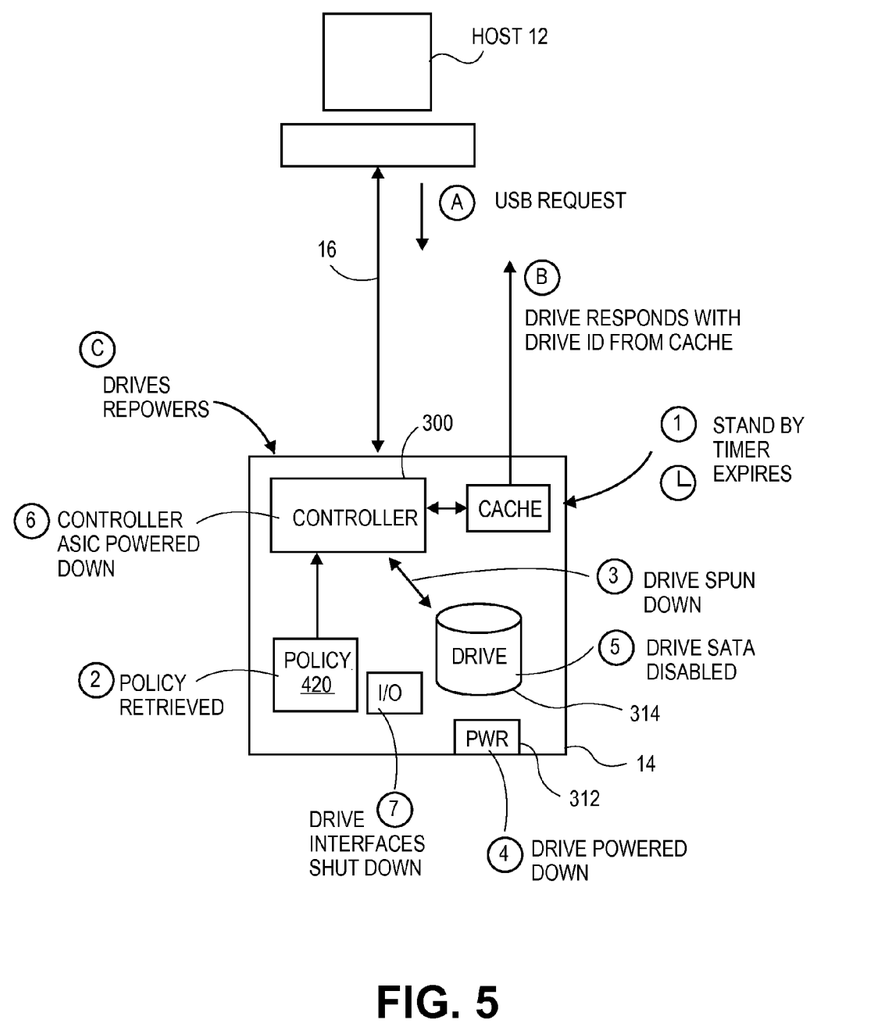
FIG. 5 shows an exemplary exchange of commands and messages that may be exchanged between a host and a direct attached storage device in accordance with the principles of the present invention.

FIG. 5 shows exemplary commands and messages that may be exchanged between a host and a direct attached storage device in accordance with the principles of the present invention. For purposes of illustration, FIG. 5 illustrates a power conservation sequence using numerical references, e.g., 1, 2, 3, 4, etc. and a repowering or restoration sequence using alphabetical references, e.g., A, B, and C.

For example, first, a stand by timer of the DASD 14 may expire to indicate that the DASD 14 is eligible to take one or more power conservation actions. Accordingly, second, the controller 300 may retrieve a policy 420. In the example shown, the DASD 14 may (third) spin down the drive 314, (fourth) power down the drive power 312, (fifth) power down the SATA portion of the controller 300, (sixth) power down itself except for its interface to the host 12, and (seventh) power down its other interfaces.

If needed, for example, when (A) the DASD 14 receives a request from the host 12 via its USB interface, then (B) the DASD 14 may immediately respond with its drive identification and other information, such as VID, etc. The DASD 14 may then (C) restore or repower itself. As noted, the DASD 14 may restore or repower itself by reversing the order of the progression or may restore from its reduced power state using a different sequence of actions. Such a sequence may be specified, for example, in the policy 420 or specified by the controller 300 depending on current operating conditions, desired performance, etc.

Figure 6:
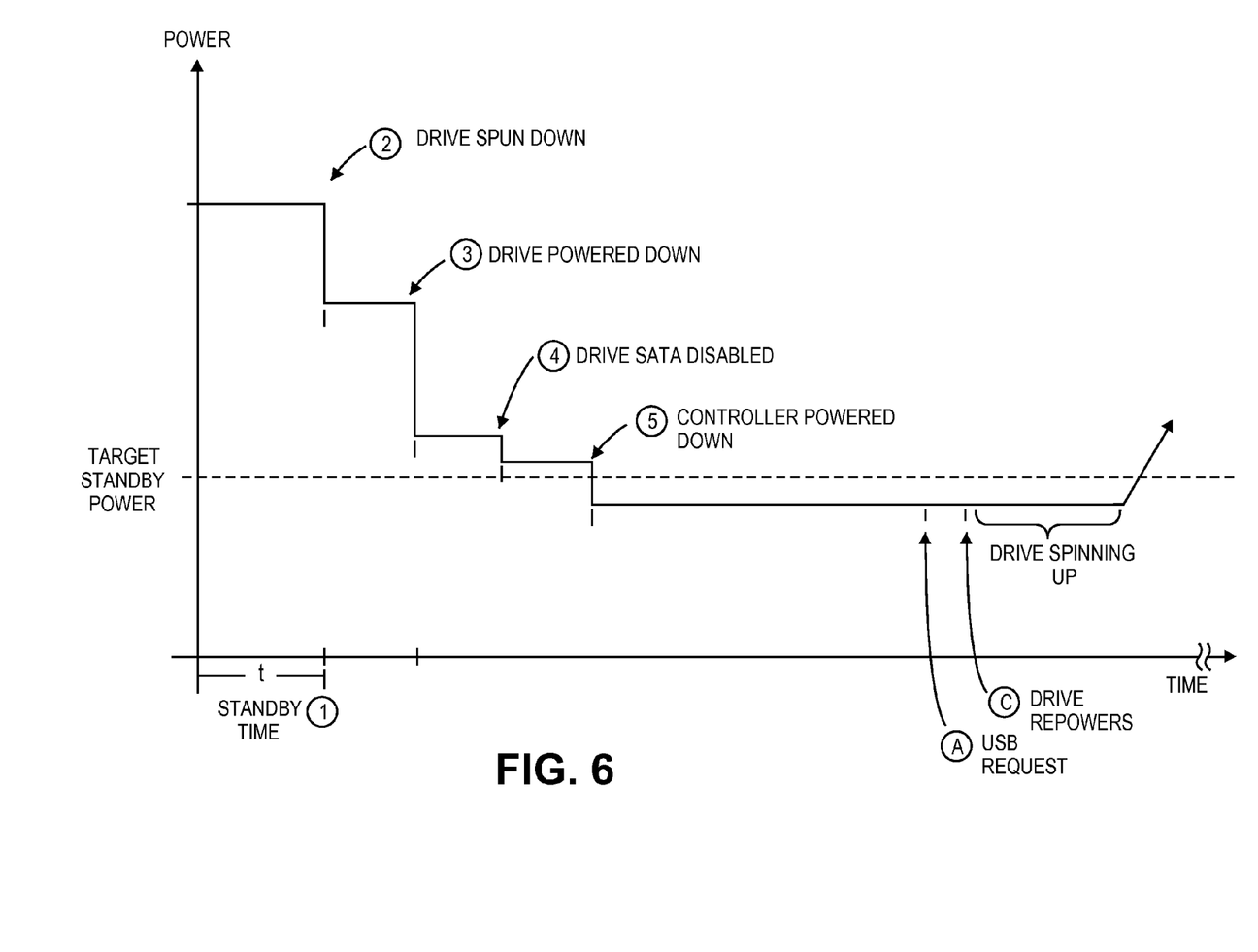
FIG. 6 shows an exemplary chart of power consumption by a direct attached storage device undergoing a progression of power saving actions.

In addition, FIG. 6 shows a progression of power saving actions by the DASD 14 to a target standby power, such as 0.45 W, 0.25 W, etc., according to an embodiment. As shown at (1), the DASD 14 may wait based on a standby time t before implementing one or more power saving actions. If the DASD 14 is eligible, then at (2) to (5), the DASD 14 may then retrieve its policy 420 and commence a progression of power saving actions.

For example, the DASD 14 may spin down the drive, power down the drive, disable the drives SATA PHY logic, and power down the controller 300 in progressive order. As shown, the DASD 14 may implement these power saving actions in fixed intervals. However, in other embodiments, the DASD 14 may implement the power saving actions in varying intervals.

As also shown in FIG. 6, after some period of time, at (A), the host device 12 may request information from the DASD 14. In response, the DASD 14 may immediately provide enumeration information and other information back to the host device 12. In addition, at (C) the DASD 14 may repower itself, for example, by spinning up its drive, etc. As noted, the DASD 14 may repower itself by reversing the order of power saving actions or may repower itself using a different order of actions. Such actions may be specified in the policy 420 or may be specified by another entity, such as the host device 12.

Other embodiments will be apparent to those skilled in the art from consideration of the specification and practice of the embodiment disclosed herein. It is intended that the specification and examples be considered as exemplary only, with a true scope and spirit of the embodiment being indicated by the following claims.

What is claimed is:

1. A method of controlling power consumption by a device, said method comprising:
    determining when a device coupled to a host is eligible for reduced power consumption;
    initiating a reduced power mode of operation by the device that consumes less power than a ready mode of operation, wherein the device continues to maintain a ready status with a host after initiating the reduced power mode; and
    selectively initiating, during continued inactivity of the device, a progression of actions to reduce power consumption by the device while the device continues to maintain the ready status with the host for at least a portion of the progression of actions.

2. The method of claim 1, wherein determining when the device is eligible for reduced power consumption comprises determining when a period of inactivity by the device has exceeded a predetermined threshold.

3. The method of claim 2, wherein determining when the period of inactivity by the device has exceeded a predetermined threshold is based on a standby timer maintained by the device.

4. The method of claim 1, wherein initiating the reduced power mode of operation by the device is initiated based on a request from the host.

5. The method of claim 1, wherein initiating the reduced power mode of operation by the device is based on a self-initiated action by the device.

6. The method of claim 1, wherein initiating the reduced power mode of operation comprises providing, by the device, a universal serial bus drive identification.

7. The method of claim 1, wherein selectively initiating the progression of actions comprises spinning down a drive of the device and entering a standby state of power operation.

8. The method of claim 1, wherein selectively initiating the progression of actions comprises turning off power to a drive of the device.

9. The method of claim 1, wherein selectively initiating the progression of actions comprises disabling an internal serial ATA PHY logic of the device.

10. The method of claim 1, wherein selectively initiating the progression of actions comprises idling bridge circuitry of the device.

11. The method of claim 1, wherein selectively initiating the progression of actions comprises shutting down at least a portion of interfaces and buses of the device while maintaining an interface with the host.

12. A storage device configured to selectively reduce its power consumption, said storage device comprising:
    a storage medium drive;
    an interface configured to communicate a host and provide storage services for information stored on the storage medium drive; and
    a controller configured to determine when the device is eligible for reduced power consumption, initiate a reduced power mode of operation by the device that consumes less power than a ready mode of operation, wherein the device continues to maintain a ready status with a host after initiating the reduced power mode, and selectively initiate, during continued inactivity of the device, a progression of actions to reduce power consumption by the device while the device continues to maintain the ready status with the host for at least a portion of the progression of actions.

13. The device of claim 12, wherein the device is a direct attached storage device and wherein the interface is a universal serial bus interface.

14. The device of claim 12, wherein the controller is configured to consume less than about 0.5 W while in the reduced power consumption mode.

15. The device of claim 12, wherein the device is configured to consume less than about 1 W from an AC main power delivered to the device.

16. The device of claim 12, wherein the device comprises an AC adapter that is compliant with an EuP standard.

17. A computing system configured to reduce its power consumption, said system comprising:
- a host device;
- a direct attached storage device coupled to the host device via a universal serial bus interface, wherein the direct attached storage device comprises a storage medium drive and
- a controller configured to determine when the device is eligible for reduced power consumption, initiate a reduced power mode of operation by the device that consumes less power than a ready mode of operation, wherein the device continues to maintain a ready status with a host after initiating the reduced power mode, and selectively initiate, during continued inactivity of the device, a progression of actions to reduce power consumption by the device while the device continues to maintain the ready status with the host for at least a portion of the progression of actions.

18. The system of claim 17, wherein the host device is configured to initiate the reduced power mode of operation of the direct attached storage device.

19. The system of claim 17, wherein, during the reduced power mode of operation, the direct attached storage device provides a universal serial bus drive identification in response to request from the host device.

20. The system of claim 19, wherein, during the reduced power mode of operation, the direct attached storage device provides immediately with information indicating an identification of the storage medium drive, PIDs, and VIDs in response to an access request by the host device.

21. The system of claim 20, wherein in response to the access request by the host device, the direct attached storage device reverses at least some of the actions to reduce power consumption.

* * * * *